US008333561B2

(12) United States Patent  (10) Patent No.: US 8,333,561 B2
Baron  (45) Date of Patent: Dec. 18, 2012

(54) VERTICAL AXIS WIND TURBINE

(76) Inventor: Richard Baron, St. Paul, MN (US)

( * ) Notice: Subject to any disclaimer, the term of this patent is extended or adjusted under 35 U.S.C. 154(b) by 903 days.

(21) Appl. No.: 12/425,822

(22) Filed: Apr. 17, 2009

(65) Prior Publication Data

US 2009/0202346 A1 Aug. 13, 2009

Related U.S. Application Data

(63) Continuation-in-part of application No. 11/279,942, filed on Apr. 17, 2006, now abandoned.

(51) Int. Cl.
*F03D 3/02* (2006.01)
(52) U.S. Cl. .......................................... 416/17; 416/111
(58) Field of Classification Search .................. 416/111, 416/17, 41, 155; 415/70, 4.2, 1.2, 4.4, 907
See application file for complete search history.

(56) References Cited

U.S. PATENT DOCUMENTS

| 330,014 | A | * | 11/1885 | Gilman | ........................... 416/17 |
|---|---|---|---|---|---|
| 1,577,096 | A | | 1/1924 | Aust | |
| 4,368,692 | A | * | 1/1983 | Kita | ................................. 122/26 |
| 4,496,847 | A | * | 1/1985 | Parkins | ........................... 290/44 |
| 6,379,115 | B1 | * | 4/2002 | Hirai | ............................... 416/17 |
| 6,537,018 | B2 | * | 3/2003 | Streetman | ...................... 415/3.1 |
| 6,609,889 | B1 | | 8/2003 | Vilsboll | |
| 7,242,108 | B1 | | 7/2007 | Dablo | |
| 2001/0015557 | A1 | | 8/2001 | Roskey | |
| 2007/0243066 | A1 | | 10/2007 | Baron | |

* cited by examiner

*Primary Examiner* — Richard Edgar
(74) *Attorney, Agent, or Firm* — Moore & Hansen, PLLC

(57) ABSTRACT

A vertical axis sail-type wind turbine includes an array of sail-like structures that are mounted on rotating main masts. The sail-like structures can be oriented to interact with the wind. For example, when the sail-like structures are moving in a downwind direction, they are oriented to present a flat surface that is perpendicular to the wind direction. On the other hand, when the sail-like structures are moving in an upwind direction, they are oriented to present a surface that is at an angle that creates an upwind vector. The sail-like structures rotate about the sail masts, which are rotatably mounted to sail mounting arms that are firmly mounted to a main mast. The main mast rotates, transferring power through a gear and shaft drive to hydraulic pumps in the tower. This hydraulic fluid pressure is then used to drive an electrical generator.

24 Claims, 10 Drawing Sheets

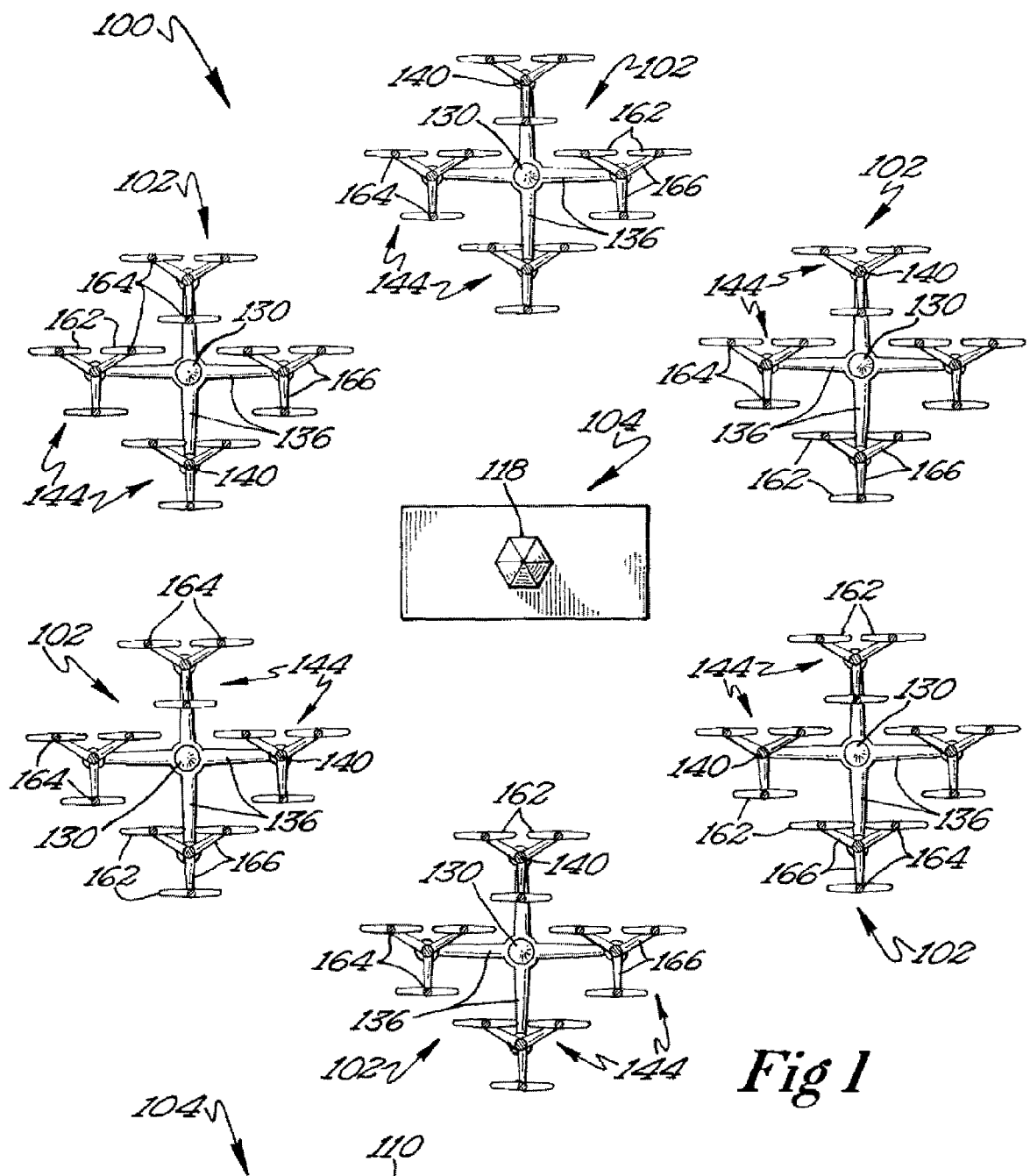
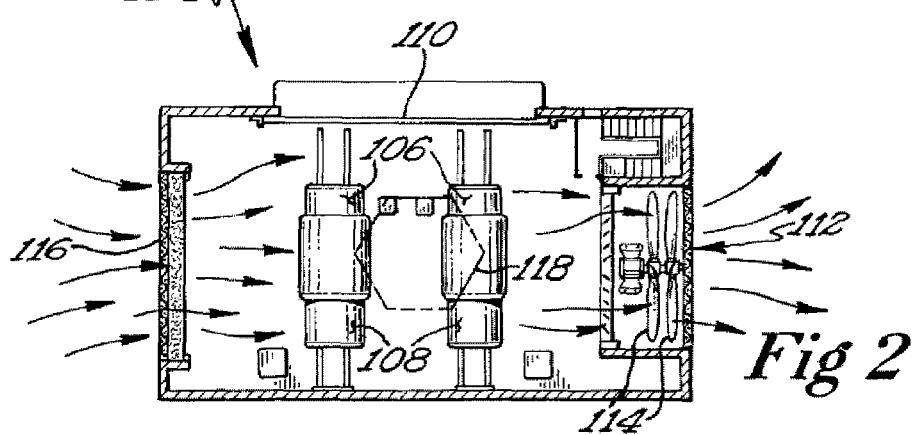

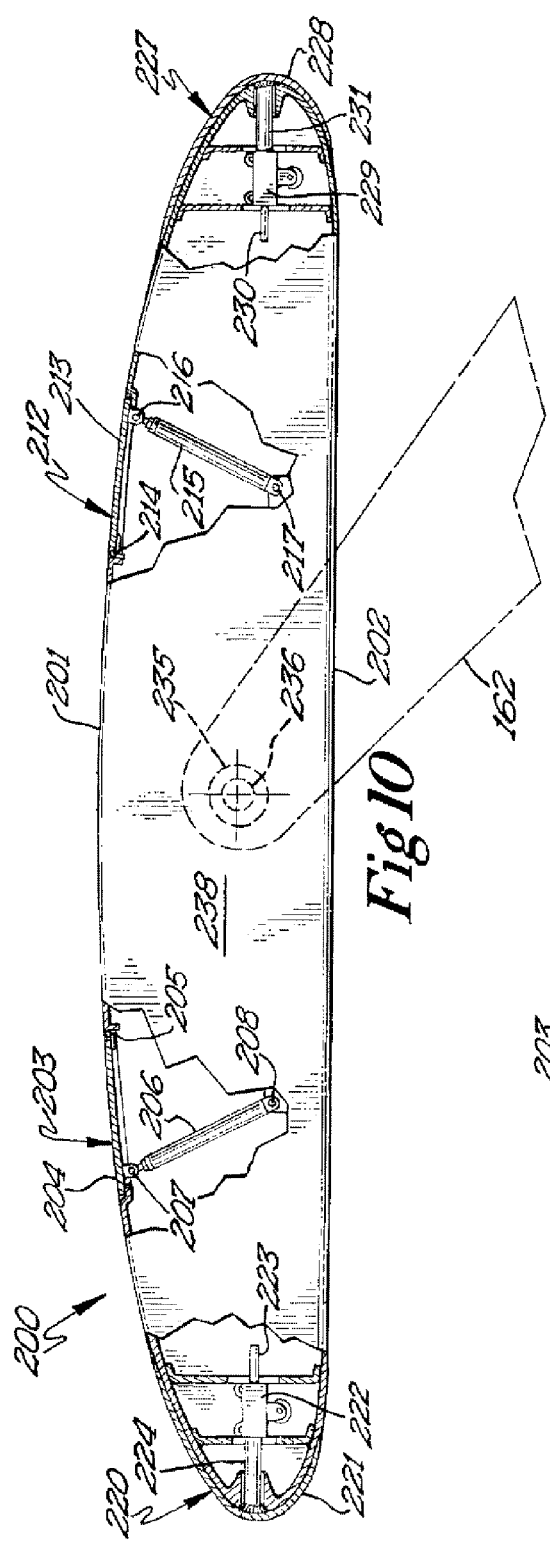
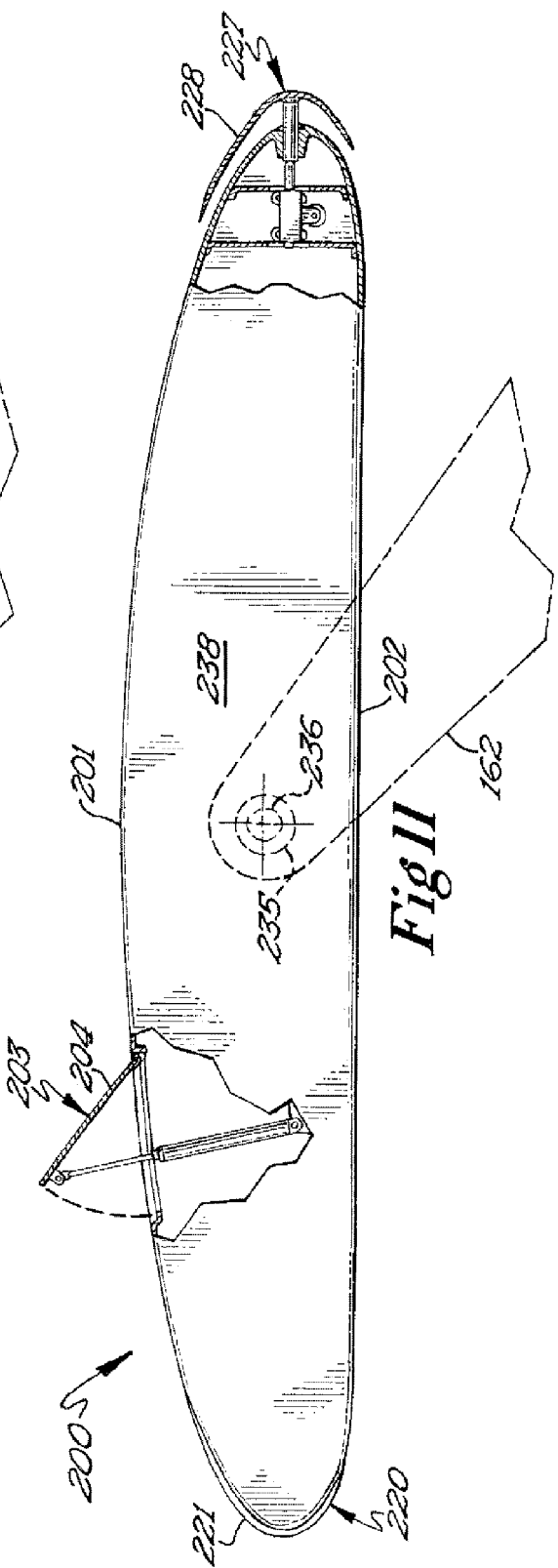

VERTICAL AXIS WIND TURBINE

CROSS-REFERENCE

This application is a continuation-in-part of application Ser. No. 11/279,942 filed Apr. 17, 2006 now abandoned.

TECHNICAL BACKGROUND

The disclosure relates generally to electrical power generation. More particularly, the disclosure relates to the generation of electricity using wind power.

BACKGROUND

Wind turbines are known in the art for converting wind power to electrical energy. Typically, wind turbines rotate around a horizontal axis. Such wind turbines are known as horizontal axis wind turbines and have a main rotor shaft and a generator mounted on top of a tower. A gearbox may be used to convert the slow rotation of the blades into a faster rotation that is more suitable for generating electrical power. Horizontal axis wind turbines must be pointed into the wind, for example, by a wind vane or a wind sensor coupled with a servo motor.

While horizontal axis wind turbines are the most common type of wind turbine, they suffer from certain drawbacks. For example, horizontal axis wind turbines are typically velocity-governed. That is, the power that they generate is dependent on the velocity of the rotating blades. Thus, they generate low amounts of power at low wind speeds. Indeed, at sufficiently low wind speeds, the blades do not rotate at all. At high wind speeds, on the other hand, the power generated is limited by the structural limitations of the blades, usually to below 25 mph. At all operable wind speeds, horizontal axis wind turbines are limited to less than 35% efficiency by the Betz limit. Accordingly, the efficiency of velocity-governed wind turbines is limited at both low and high wind speeds. Other drawbacks that are particularly evident at high speeds include, for example, high noise levels and large numbers of birds killed by blade tips rotating at extremely high velocities. In addition, increasing the speed of the rotating blades in order to extract more energy from the wind creates centrifugal forces that impart cyclic stresses, thereby leading to fatigue of the blades, axles, and bearing material. These stresses are particularly problematic under gusty or changing wind conditions.

Some wind turbines, known as vertical axis wind turbines, rotate around a vertical axis. One example of a vertical axis wind turbine is a Darrius or "egg beater" type wind turbine. In such wind turbines, the main rotor shaft runs vertically, as contrasted with the horizontal rotor shafts of horizontal axis wind turbines. Unlike horizontal axis wind turbines, vertical axis wind turbines can incorporate the generator and gearbox near the bottom of the structure. As a result, the tower does not need to support the generator and gearbox, and the turbine does not need to be pointed into the wind. Some conventional vertical axis wind turbines also suffer from some drawbacks, such as a pulsating torque produced during each revolution. In addition, mounting vertical axis turbines on towers is relatively difficult. As a result, vertical axis turbines typically operate in the slower, more turbulent airflow near the ground. With the airflow slower and more turbulent relative to higher altitudes, vertical axis wind turbines may extract energy from wind less efficiently than horizontal axis wind turbines. In addition, vertical axis wind turbines, like horizontal axis wind turbines, are typically velocity-governed and suffer from many of the same problems exhibited by horizontal axis wind turbines, including, for example, efficiency limitations at both high and low wind speeds and stresses imparted by centrifugal forces.

SUMMARY OF THE DISCLOSURE

According to various example embodiments, a vertical axis sail-type wind turbine includes an array of sail-like structures that are mounted on rotating sail masts. The sail-like structures can be oriented to interact with the wind. For example, when the sail-like structures are moving in a downwind direction, they are oriented to present a flat surface that is perpendicular to the wind direction. On the other hand, when the sail-like structures are moving in an upwind direction, they are oriented to present a surface that is at an angle that creates an upwind vector. The sail-like structures rotate about the sail masts which are rotatably mounted to sail mounting arms that are firmly mounted to a main mast. The main mast transfers power through a gear and shaft drive to hydraulic pumps in the tower. This hydraulic fluid pressure is then used to drive an electrical generator.

One embodiment is directed to a wind turbine. At least four transverse mounting arms are mounted on and supported by a main tower. At least two sail assemblies are mounted between the at least four transverse mounting arms, one on each side of the tower. The sail assembly comprises a main mast defining a vertical axis of rotation. At least two sail arms are mounted on and supported by the main mast. A sail is mounted between the at least two sail arms. The sail is configured to rotate about the vertical axis of rotation in response to wind. A hydraulic pump is configured and arranged to generate a hydraulic output in response to rotation of the sail about the vertical axis of rotation.

In another embodiment, a wind turbine arrangement includes a number of wind turbines. Each wind turbine includes a main tower and at least four transverse mounting arms mounted on and supported by the main tower. Two sail assemblies are mounted to the at least four transverse mounting arms on opposite sides of the tower. The sail assembly comprises a main mast defining a vertical axis of rotation. At least two sail arms are mounted on and supported by the main mast. A sail is mounted between the at least two sail arms. The sail is configured to rotate about the vertical axis of rotation in response to the wind. Each wind turbine is configured to generate a hydraulic output in response to rotation of the sail about the vertical axis of rotation. The hydraulic outputs of the wind turbines are linked together. A hydraulic motor is configured to receive the linked hydraulic outputs of the wind turbines and to drive an electrical generator. The hydraulic motor and the electrical generator may be housed in a control building, along with other components, such as a microprocessor-based system for controlling the operation of the wind turbine arrangement.

Another embodiment is directed to a wind turbine comprising a main tower. Transverse mounting arms are mounted on and supported by the main tower. Sail assemblies are mounted between at least four of the transverse mounting arms. Each sail assembly has a main mast defining a vertical axis of rotation and at least two sail arms mounted on and supported by the main mast. Sails are mounted between the sail arms. The sails are configured to rotate about the vertical axis of rotation in response to the wind. A hydraulic pump is configured and arranged to generate a hydraulic output in response to rotation of the sail assemblies about the vertical axes of rotation.

Various embodiments may provide certain advantages. The wind turbine disclosed herein is torque-governed rather than velocity-governed and can therefore generate power at a wide range of wind speeds. Also, compared to the blades in a horizontal axis wind turbine, the sail-like structures of the vertical axis wind turbine are less susceptible to flexion and extension under even gusty or changing wind conditions. Thus, the need for maintenance and replacement parts is significantly reduced. In addition, the wind turbine can extract energy from the wind in both downwind and upwind directions. Also, the wind turbine is both laterally and vertically scalable to enable power generation on a larger scale than has previously been realized, particularly with horizontal axis wind turbines.

Additional objects, advantages, and features will become apparent from the following description and the claims that follow, considered in conjunction with the accompanying drawings.

BRIEF DESCRIPTION OF THE DRAWINGS

FIG. 1 is a plan view of a wind turbine arrangement according to one embodiment.

FIG. 2 is a plan view of a portion of the wind turbine arrangement of FIG. 1.

FIG. 10 is a diagrammatic cross-sectional view of an embodiment of a wing.

FIG. 11 is an alternative view of FIG. 10 in which portions of the wing are in alternative configurations.

DESCRIPTION OF VARIOUS EMBODIMENTS

Figure 3:
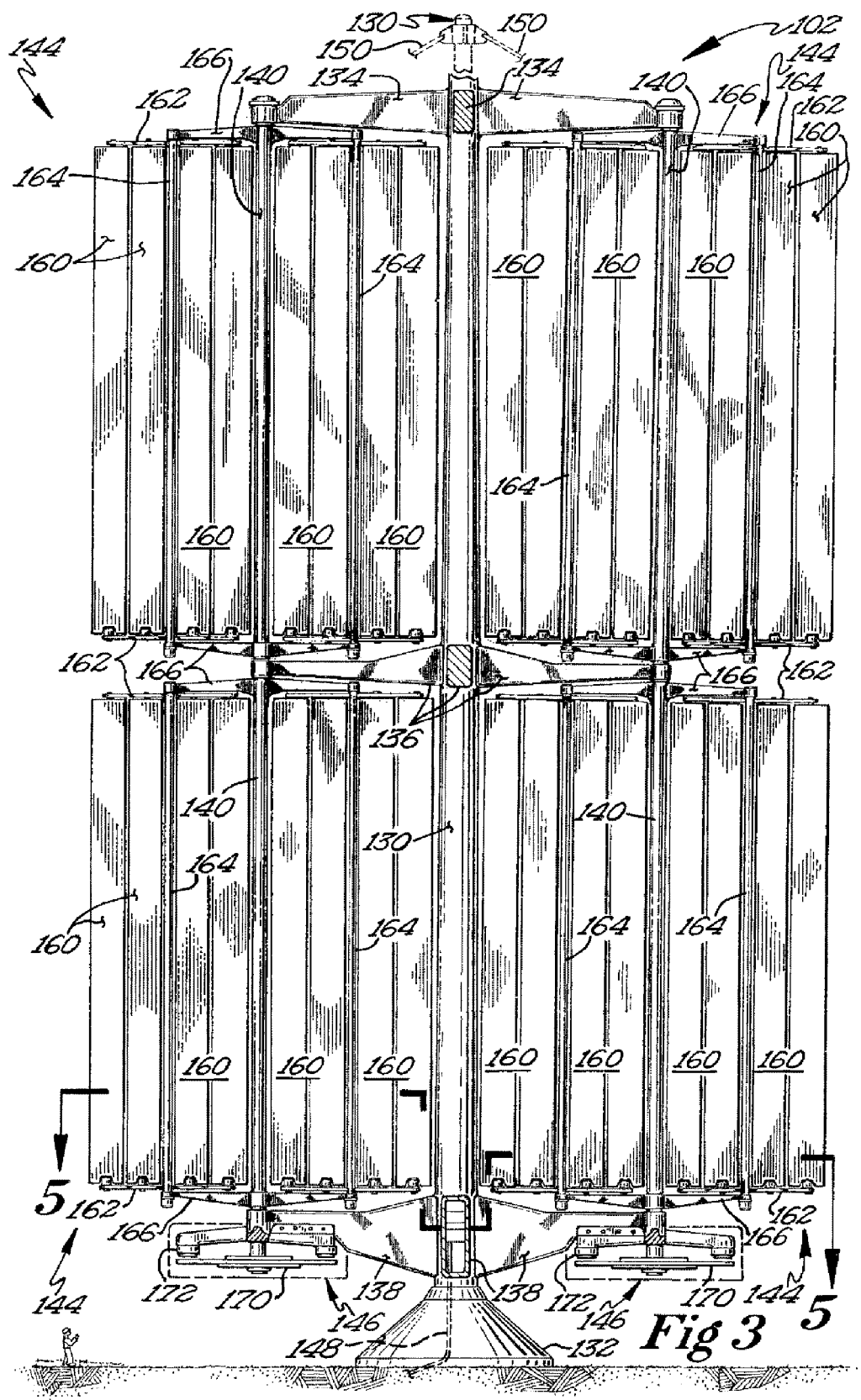
FIG. 3 is an elevational view of a wind turbine forming part of the wind turbine arrangement of FIG. 1, according to another embodiment.

According to various example embodiments, a vertical axis sail-type wind turbine includes an array of sail-like structures that are mounted on rotating sail masts. When the sail-like structures are moving in a downwind direction, they are oriented to present a flat surface that is perpendicular to the wind direction. When the sail-like structures are moving in an upwind direction, the sails are perpendicular to the wind, but the wings are oriented to present a surface that is at an angle that creates an upwind vector. The sail-like structures rotate about the sail masts, which are rotatably mounted to sail arms that are firmly mounted to a main mast. The main mast is supported by the transverse arms and transfers power through a gear and shaft drive to hydraulic pumps in the tower. This hydraulic fluid pressure is then used to drive an electrical generator. The use of hydraulic power transfer eliminates the transmission and planetary gear systems that are characteristic of many conventional wind turbines.

In the following description, numerous specific details are set forth in order to provide a thorough understanding of various embodiments. It will be apparent to one skilled in the art that some embodiments may be practiced without some or all of these specific details. In other instances, well known components and process steps have not been described in detail.

Various embodiments may be described in the general context of processor-executable instructions, such as program modules, being executed by a processor. Generally, program modules include routines, programs, objects, components, data structures, etc., that perform particular tasks or implement particular abstract data types. Such instructions may also be handled in distributed processing environments in which tasks are performed by remote processing devices that are linked through a communications network or other data transmission medium. In a distributed processing environment, program modules and other data may be located in both local and remote storage media, including memory storage devices.

Referring now to the drawings, FIG. 1 is a top plan view of a wind turbine array 100 according to one embodiment. The wind turbine array 100 is illustrated in FIG. 1 as including six wind turbines 102. Persons of ordinary skill in the art will appreciate that the wind turbine array 100 may include more or fewer wind turbines 102 than are illustrated in FIG. 1, and that the wind turbines 102 may be arranged in a configuration that is either similar to or different from the configuration shown in FIG. 1.

The wind turbine array 100 also includes a control building 104. The control building 104 is illustrated as being located proximate the geographic center of the wind turbine arrangement 100. Locating the control building 104 in this position facilitates monitoring the operation of the wind turbines 102. In addition, in this configuration, the control lines and hydraulic fluid lines between the various wind turbines 102 and the control building 104 can be made substantially uniform. In this way, the control and hydraulic fluid lines between any individual wind turbine 102 and the control building 104 are prevented from being excessively long. However, persons of ordinary skill in the art will appreciate that the control building 104 may be located in another position relative to the wind turbine arrangement 100.

FIG. 2 is a plan view illustrating the control building 104. The control building 104 includes two generators 106 and two hydraulic motors 108 that are hydraulically coupled with the wind turbines 102 via hydraulic fluid lines (not shown). It will be appreciated by those of ordinary skill in the art that the control building 104 may incorporate more or fewer generators 106 and hydraulic motors 108 than are shown in FIG. 2. In some embodiments, the control building 104 may have a door 110 that is sized and arranged to allow the generators 106 to be pulled out on wheels should the need to replace or service the generators 106 arise.

When the wind turbines 102 extract mechanical energy from wind, hot hydraulic fluid, at high pressure, is pumped through the hydraulic fluid lines to the control building 104. The hydraulic fluid outflows from the various wind turbines 102 are combined into a single hydraulic fluid line using pressure equalizers (not shown) to equalize the fluid pressure in the hydraulic fluid outflows from the various wind turbines 102. Equalizing the fluid pressure in this way prevents hydraulic fluid from flowing backward through the hydraulic fluid lines. By linking hydraulic outputs, the same number of generators can be used for multiple towers in a wind farm, thereby facilitating expansion of the wind farm. A splitter (not shown) splits the hydraulic fluid output of the combined hydraulic fluid line into multiple lines that drive the generators 106.

The hydraulic fluid drives the generators 106, thereby generating electrical power as the wind turbines 102 rotate in response to the wind. As the hydraulic fluid drives hydraulic motors which drive the generators 106, its fluid pressure decreases, while its temperature remains hot. The hot hydraulic fluid output from the motors 108 is then cooled, for example, using a cooling system. The cooling system may incorporate exhaust fans 114, a radiator 112, and an intake filter 116. Air from the outside environment is drawn in under negative pressure by the exhaust fans 114 through the intake filter 116. The air cools the hydraulic fluid and is returned to the outside environment. The cooled hydraulic fluid is then returned to the wind turbines 102.

The control building 104 also includes a control tower 118, which may be located on an upper floor of the control building 104. The control tower 118 may have a hexagonal profile as shown in FIG. 2 to facilitate monitoring the operation of the wind turbines 102. Alternatively, the control tower 118 may have a circular or substantially circular profile. The control tower 118 controls and monitors various aspects of the operation of the wind turbine array 100, including, for example, the hydraulic system, the individual wind turbines 102, and the generator output.

The control tower 118 incorporates a microprocessor-based system (not shown) that executes software to control the operation of the wind turbine array 100. The microprocessor-based system is typically configured to operate with one or more types of processor readable media. Processor readable media can be any available media that can be accessed by the microprocessor-based system and includes both volatile and nonvolatile media, removable and non-removable media. By way of example, and not limitation, processor readable media may include storage media and communication media. Storage media includes both volatile and nonvolatile, removable and nonremovable media implemented in any method or technology for storage of information such as processor-readable instructions, data structures, program modules, or other data. Storage media includes, but is not limited to, RAM, ROM, EEPROM, flash memory or other memory technology, CD-ROM, digital versatile discs (DVDs) or other optical disc storage, magnetic cassettes, magnetic tape, magnetic disk storage or other magnetic storage devices, or any other medium that can be used to store the desired information and that can be accessed by the microprocessor-based system. Communication media typically embodies processor-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also intended to be included within the scope of processor-readable media.

According to certain embodiments, the microprocessor-based system obtains and interprets real-time input parameters relating, for example, to the wind velocity and direction, the rotation and position of the sails, power generation, and hydraulic fluid pressures. Based on these input parameters, the microprocessor-based system adjusts various aspects of the operation of the wind turbine array 100. For example, the microprocessor-based system may adjust the orientation of the wings to obtain maximum power in both downwind and upwind movements. In addition, the microprocessor-based system maintains a substantially constant rotational speed of the wind turbines at, for example, 20 revolutions per minute, by adjusting the load on the generators 106. To accomplish this adjustment, the microprocessor-based system may adjust the armature strength upward or downward in real time.

FIG. 3 is an elevational view of one of the wind turbines 102 forming part of the wind turbine array 100. The wind turbine 102 includes a main tower 130 supported on a base 132. In one embodiment, the main tower is approximately 250 feet tall. A main mast is bearing mounted to the main tower 130 via transverse mounting arms 134, 136, and 138. The main tower 130, which remains substantially stationary during operation of the wind turbine 102, supports transverse mounting arms 134, 136, and 138, which also remain substantially stationary during operation of the wind turbine 102. Rotatable main masts 140 are mounted on and supported between transverse mounting arms 134 and 136 and transverse mounting arms 136 and 138, respectively. In addition, a third and fourth main mast (not visible in FIG. 3) are mounted on and supported between each pair of transverse mounting arms, such that two pairs of transverse mounting arms are associated with two main masts and six sails. The rotatable main masts define vertical axes of rotation. Sail arms 162 are mounted to the main masts. The sail masts are rotatably mounted to the ends of the sail arms. The crossbeams are fixedly mounted to the sail arms and the sails are rotatably mounted to the crossbeams. The structure and operation of the sails 144 are described more fully below in connection with FIG. 4. Four such assemblies of sails 144 and main masts 140 are mounted at 90 degree intervals around the main tower 130.

Near the bottom of the wind turbine 102, flywheel assemblies 146 maintain a constant rotational velocity and provide gyroscopic stabilization for the rotating sail assemblies and provide a braking surface for four hydraulic brakes on each flywheel. The structure and operation of the flywheel assemblies 146 are described more fully below in connection with FIG. 5.

According to some embodiments, the wind turbine 102 is both horizontally and vertically scalable to efficiently capture the mechanical energy contained in the wind. The wind turbine 102 may be horizontally scaled by increasing the width of the sails 144. Additionally, the wind turbine 102 may be vertically scaled by adding one or more further levels of sails 144. As the wind turbine 102 is constructed to greater heights (e.g., 500 or 750 feet), guywires 150 may be required to stabilize the wind turbine 102. The guywires are illustrated only schematically because it is believed that a more specific design of guywire support may be required, although this is not known to be a certainty.

Figure 4:
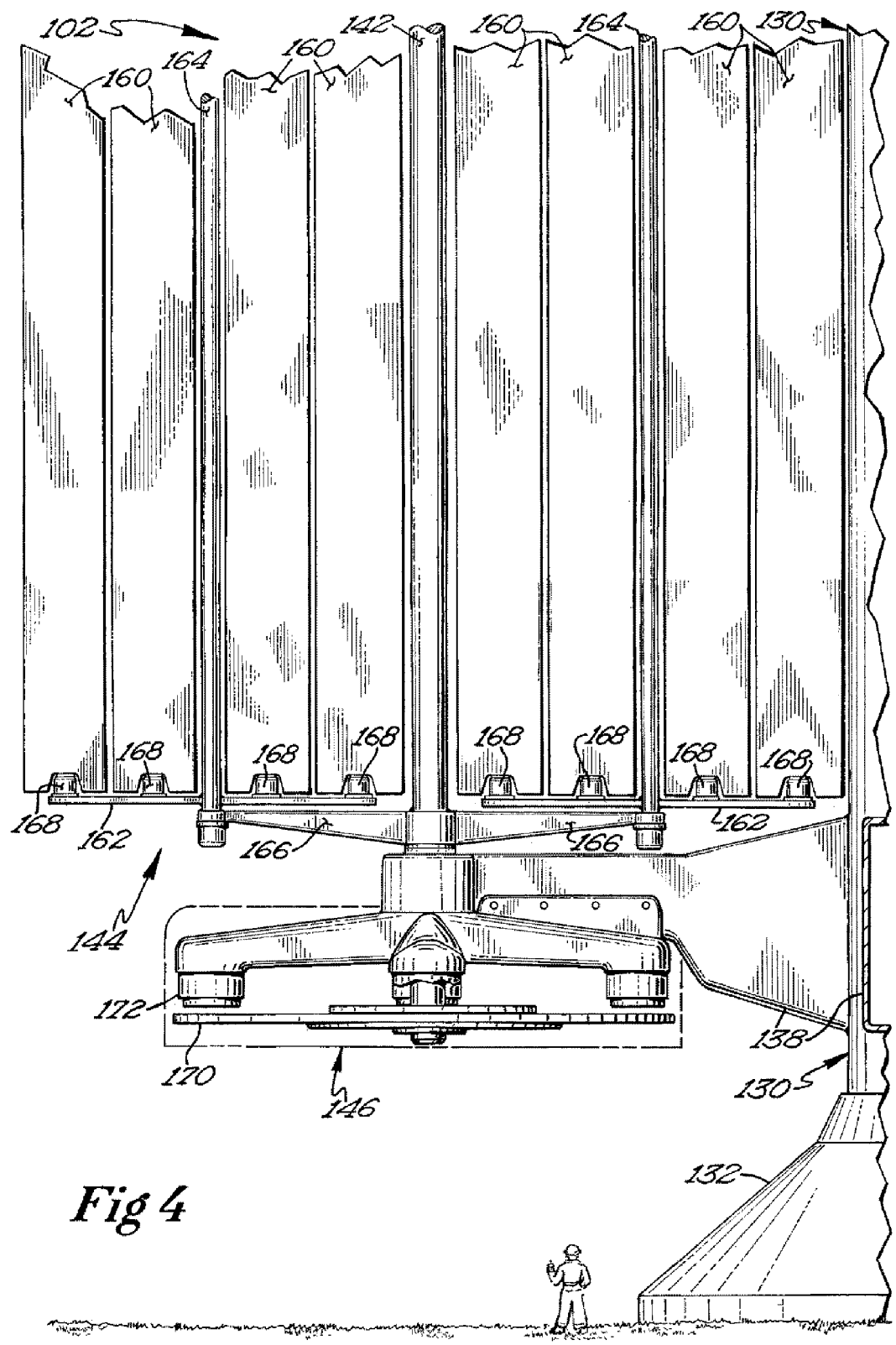
FIG. 4 is an elevational view of a portion of the wind turbine of FIG. 3.

FIG. 4 is an enlarged elevational view of a lower portion of the wind turbine 102. Among other structures, FIG. 4 illustrates the sails 144 in greater detail. It should be noted that, while two sails 144 are visible in FIG. 4, each main mast, such as the main mast 140 shown in FIG. 4, preferably has three sails 144 mounted thereon. Each sail 144 includes a number of wings 160 mounted between two crossbeams, one of which is shown as sail arm 162 in FIG. 4, and the other of which is not visible in FIG. 4. Preferably, each sail 144 includes two wings 160 on each side of the sail 144, promoting symmetry and thereby enabling the sail 144 to balance itself. The crossbeams 166 are firmly mounted to the sail mast 164. The sail mast 164 is rotatably mounted to the end of the sail arm 162, which is itself fixedly mounted to the main mast 140. The main masts 142 are rotatably mounted on the transverse arms 138, which are fixedly mounted to the tower 130.

The wings 160 can be rotated using individual servo motors 168. In this way, the orientation of the sails 144 is precisely controlled by the servo motors 168 as the sails 144 rotate about the axes of rotation defined by the sail masts. In particular, the wings 160 are oriented to create a flat surface perpendicular to the wind direction when a sail 144 is moving downwind. When the sail 144 is moving upwind, the wings 160 remain perpendicular to the wind and are oriented to create a surface at an angle that creates an upwind vector.

Figure 7:
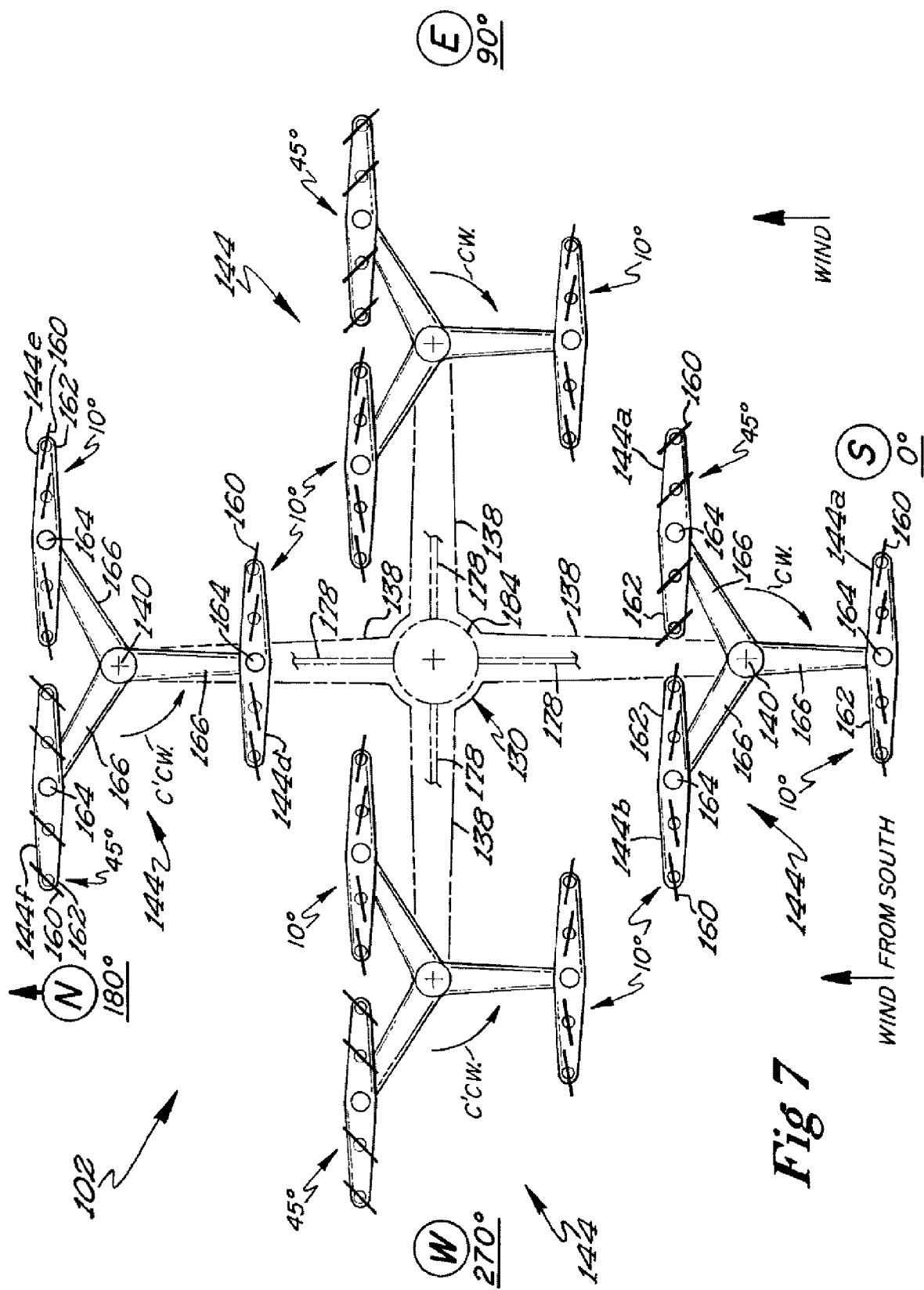
FIG. 7 is a diagrammatic top plan view of a wind turbine showing selected sail positions with a given wind direction, according to another embodiment.

FIG. 7 illustrates one particular scheme according to which the wings 160 may be rotated. In order to avoid unnecessarily complicating the disclosure of the operation of the wings 160, only a selected set of orientations is disclosed herein in connection with FIG. 7. In the example shown in FIG. 7, a wind originates from the south, indicated at the bottom of FIG. 7.

In response to the wind from the south, certain sail assemblies will rotate clockwise, while others opposed 180 degrees will rotate counterclockwise. In both cases, there are four possible transition points at which the orientation of the wings 160 may change. These transition points occur at 90 degree intervals throughout the 360 degree rotational cycle. Whether a given sail assembly rotates clockwise or counterclockwise, transitions will occur at the 0 degree and 180 degree points. Further, if the sail assembly is rotating clockwise, a transition will also occur at the 90 degree point, but not at the 270 degree point. On the other hand, if the sail assembly is rotating counterclockwise, a transition will occur at the 270 degree point, but not at the 90 degree point.

Figure 8:
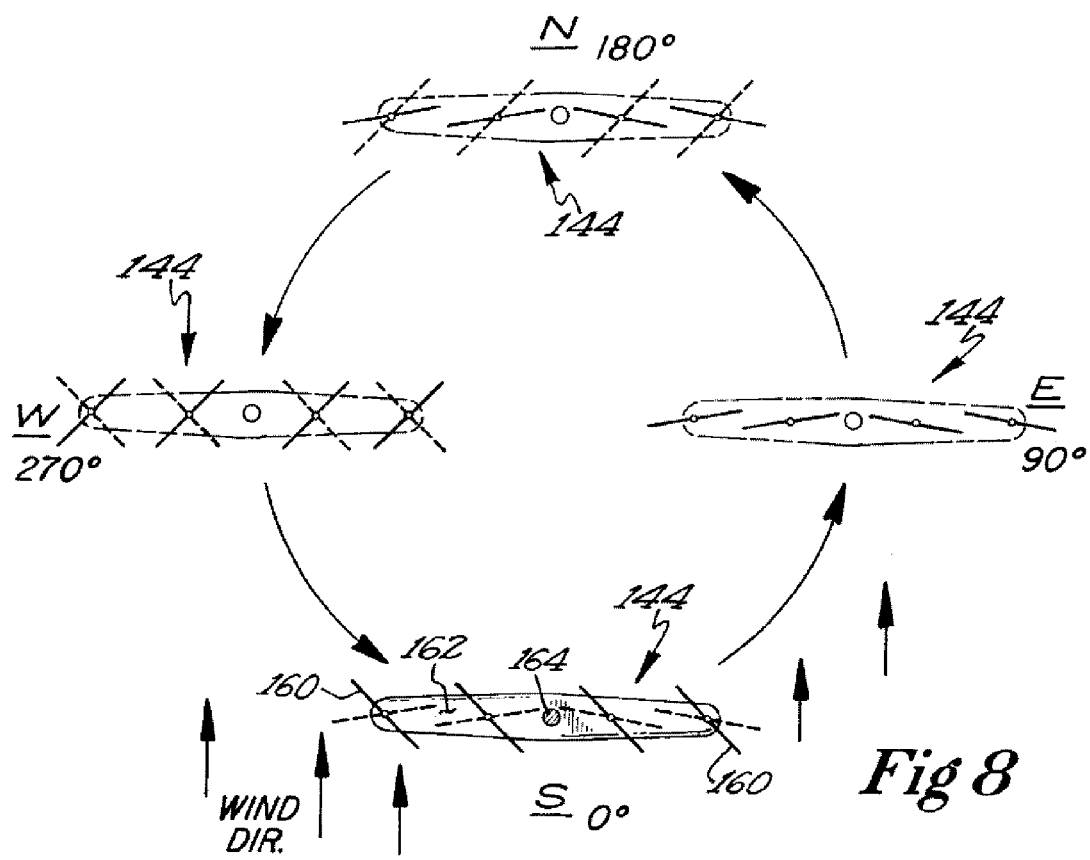
FIG. 8 is a diagrammatic top plan view of a wind turbine showing transitions between sail positions as the sail rotates in one direction.

FIG. 8 illustrates the transition points when the sail assembly rotates counterclockwise with a wind from the south. At each transition point, solid lines indicate the position of the wings immediately before the transition point, while dashed lines indicate the position of the wings immediately after the transition point. Immediately before the 0 degree point, the wings are oriented at a 45 degree angle. As the sail assembly rotates counterclockwise through the 0 degree point, the wings are oriented essentially flat, e.g., at 10 degree angles canted toward the sail mast. No transition occurs at the 90 degree point, but as the sail assembly rotates through the 180 degree point, the wings change in orientation from an essentially flat angle to a 45 degree angle. As the sail assembly rotates through the 270 degree point, the wings change orientation again, this time from a 45 degree angle to a 45 degree angle in an opposite direction. The wings remain in this orientation until the sail assembly rotates through the 0 degree point.

Figure 9:
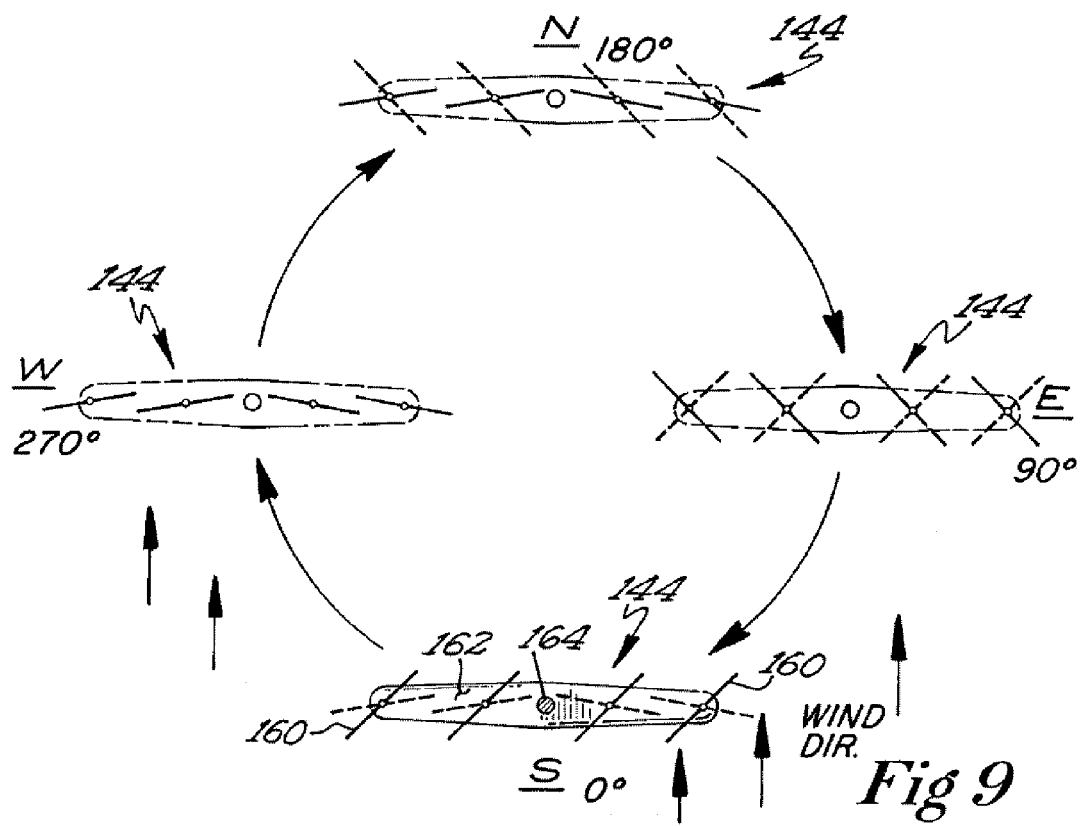
FIG. 9 is a diagrammatic top plan view of a wind turbine showing transitions between sail positions as the sail rotates in another direction.

FIG. 9 illustrates the transition points when the sail assembly rotates clockwise with a wind from the south. At each transition point, solid lines indicate the position of the wings immediately before the transition point, while dashed lines indicate the position of the wings immediately after the transition point. Immediately before the 0 degree point, the wings are oriented at a 45 degree angle. As the sail assembly rotates clockwise through the 0 degree point, the wings are oriented essentially flat, e.g., at 10 degree angles canted toward the sail mast. No transition occurs at the 270 degree point, but as the sail assembly rotates through the 180 degree point, the sails remain perpendicular to the wind but the wings change in orientation from an essentially flat angle to a 45 degree angle. From the 180 degree point, the wing tacks upwind away from a line drawn between 0 degrees and 180 degrees and bisecting the main mast. As the sail assembly rotates through the 90 degree point, the wings change orientation again, this time from a 45 degree angle to a 45 degree angle in an opposite direction. As the wing crosses the 90 degree point, it tacks back towards the above-defined line. The wings remain in this orientation until the sail assembly rotates through the 0 degree point.

As a particular example, the sail assembly located at the south position on FIG. 7 rotates clockwise. The sail 144*a* at the 0 degree position initially has its wings 160 oriented inward toward the center of the sail 144*a* at a 10 degree angle so as to present a substantially flat surface perpendicular to the wind direction. This orientation promotes capturing the mechanical energy of the wind, and is maintained as the sail 144*a* rotates clockwise through the 270 degree position. As the sail 144*a* continues to rotate clockwise through the 180 degree position, however, the sail 144*a* transitions from moving downwind to moving upwind. Accordingly, as the sail 144*a* rotates through the 180 degree position, the wings 160 are rotated to a 45 degree orientation, so as to create an upwind vector. In this way, energy may be captured during both the downwind movement and the upwind movement. This wing orientation is maintained until the sail 144*a* rotates through the 90 degree position, at which point the wings 160 are rotated to a 45 degree orientation in the opposite direction, such that the upwind vector is maintained. This new orientation is maintained until the sail 144*a* rotates through the 0 degree position, at which point the wings 160 return to the orientation shown in the sail 144*a* at the 0 degree position. The sail assembly located at the east position on FIG. 7 also rotates clockwise, like the sail assembly located at the south position. Accordingly, the movement of the wings 160 is similar between these two sail assemblies.

As another example, the sail assemblies located at the north and west positions on FIG. 7 rotate counterclockwise and likewise exhibit similar movement of the wings 160. In this case, turning to the sail assembly located at the north position on FIG. 7, the sail 144*d* at the 0 degree position initially has its wings 160 oriented inward toward the center of the sail 144*d* at a 10 degree angle so as to present a substantially flat surface perpendicular to the wind direction. This orientation promotes capturing the mechanical energy of the wind, and is maintained as the sail 144*d* rotates counterclockwise through the 90 degree position. As the sail 144*d* continues to rotate counterclockwise through the 180 degree position, however, the sail 144*d* transitions from moving downwind to moving upwind. Accordingly, as the sail 144*d* rotates through the 180 degree position, the wings 160 are rotated to a 45 degree orientation, so as to create an upwind vector. In this way, energy may be captured during both the downwind movement and the upwind movement. This wing orientation is maintained until the sail 144*d* rotates through the 270 degree position, at which point the wings 160 are rotated to a 45 degree orientation in the opposite direction, such that the upwind vector is maintained. This new orientation is maintained until the sail 144*d* rotates through the 0 degree position, at which point the wings 160 return to the orientation shown in the sail 144*d* at the 0 degree position.

In some embodiments, the servo motors 168 are further controlled by the microprocessor-based system, which analyzes real-time sensor-obtained information on wind speed, wind direction, sail position, and sail mast position. The microprocessor-based system then continuously moves the wings and sails using the servo motors to resist the maximum wind force. The microprocessor-based system is also programmed to cause the wind turbine 102 to generate increased torque, rather than increased velocity, as the wind speed increases.

The generator 106 is driven by a hydraulic motor 108 that is connected to the hydraulic pumps in the tower. The microprocessor-based system uses real-time sensor monitoring of wind velocity, hydraulic fluid output pressure, and generator field output power to continuously adjust the armature strength to maintain the mainsail mast and armature of the generators 106 of FIG. 2 at a constant speed, for example, 20 revolutions per minute. The generator field is wound so as to create a 60 Hz AC current when the armature is maintained at 20 revolutions per minute. This power can then be stepped up via a transformer to transmission voltage and uplinked to a power grid.

As the sails 144 rotate, asymmetric power loading on the main masts during downwind versus upwind rotation would cause a lateral oscillation in at least two directions. This problem is resolved by the following means: First, downwind sail rotations on opposite sides of the main tower 130 are counterrotating. For example, in FIG. 7, the north sail assembly and the south sail assembly rotate in opposite directions. Similarly, the east and west sail assemblies rotate in opposite directions. As a result, equal and opposite oscillation forces on the main tower 130 are generated.

Figure 5:
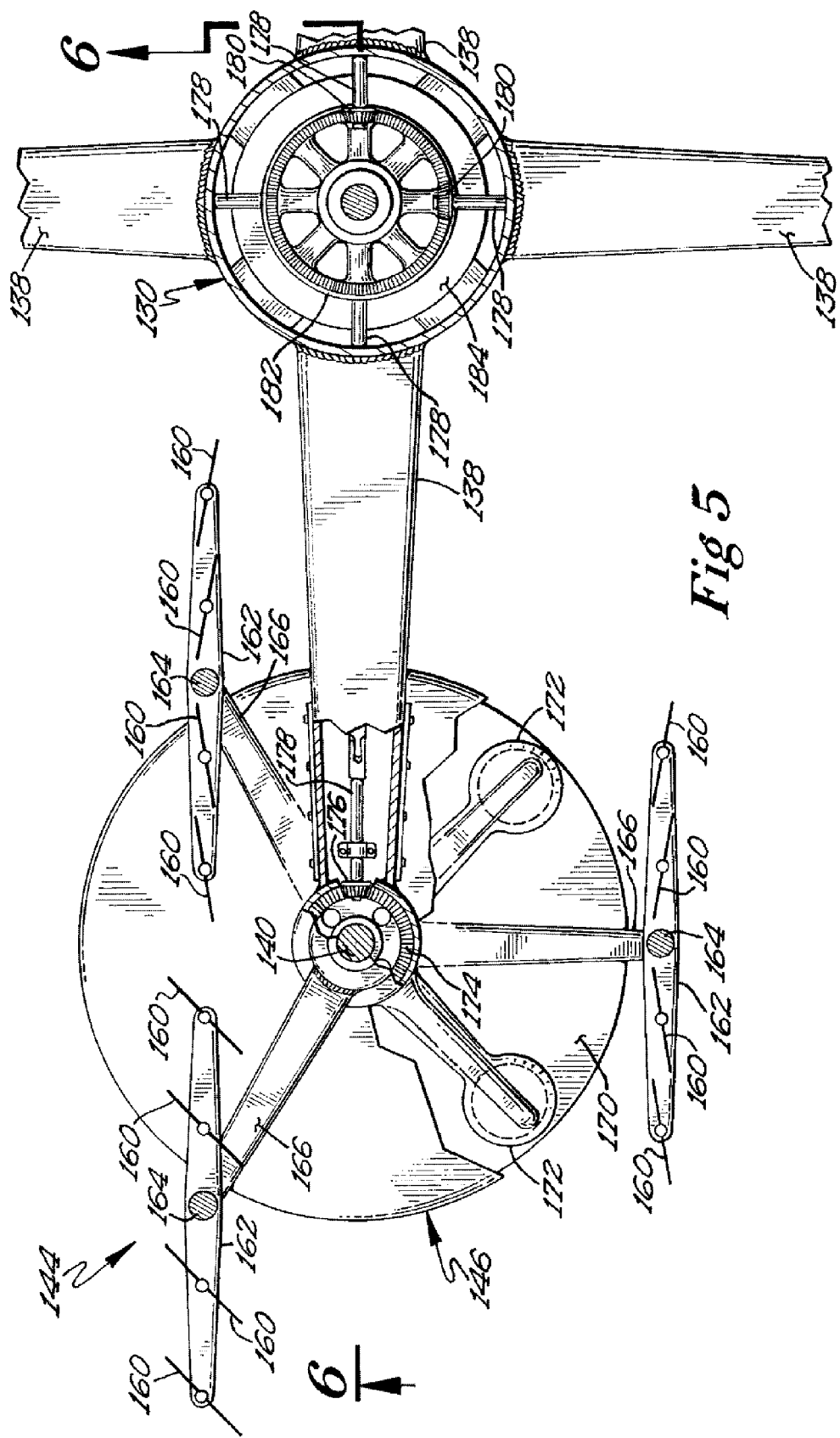
FIG. 5 is a sectional view taken along lines 5-5 of FIG. 3, showing certain details of the wind turbine of FIG. 3.

Second, the flywheel assemblies 146 at the lower end of each main mast serve as a gyroscope preventing any remaining oscillation forces and generating a smooth, constant power output. FIG. 5 is a sectional view taken along lines 5-5 of FIG. 3. While only one flywheel assembly 146 is visible in FIG. 5, it will be appreciated that the wind turbine 102 includes four flywheel assemblies 146 surrounding the lower end of the main tower 130. Each flywheel assembly 146 acts as a gyroscope to resist extraneous oscillation forces. With four flywheel assemblies 146 surrounding the lower end of the main tower 130, the main tower is extremely stable.

Each flywheel assembly 146 includes a flywheel 170, which may be approximately 12 feet in diameter. The flywheel 170 has an upper surface that also serves as a brake disk for hydraulic brakes 172. In one embodiment, the flywheel assembly 146 has four hydraulic brakes 172, two of which are visible in FIG. 5. The flywheel 170 is weighted to contain four times the energy of one main mast revolution.

FIG. 5 also illustrates an exemplary drive mechanism for transferring the mechanical energy extracted from the wind by the sails 144 to the hydraulic pumps contained in the main tower 130. These hydraulic pumps are in turn hydraulically coupled to hydraulic motors in the control building 104. As the sails 144 rotate about the rotational axis defined by the main mast 140, they drive a ring gear 174, which interacts with a pinion gear 176 affixed to a shaft 178 to cause the shaft 178 to rotate. In some embodiments, the shaft 178 is capable of expanding and contracting without adversely affecting the operation of the gears 174 and 176. This capability may be provided by a slip fitting or spline joint, as shown in FIG. 5, or by a universal joint, which would be considerably more expensive to implement than a slip fitting.

As the shaft 178 rotates, a pinion gear 180 at the opposite end of the shaft 178 relative to the gear 176 rotates and drives a double ring gear 182 in the main tower 130. The double ring gear 182 drives the hydraulic pumps (not shown in FIG. 5) at the base of the main tower 130. In addition, linking the outputs of the sail assemblies in this way maintains synchronization between the rotating sail assemblies. The hydraulic motors are coupled to generators in the control building 104, thereby generating electrical energy.

Figure 6:
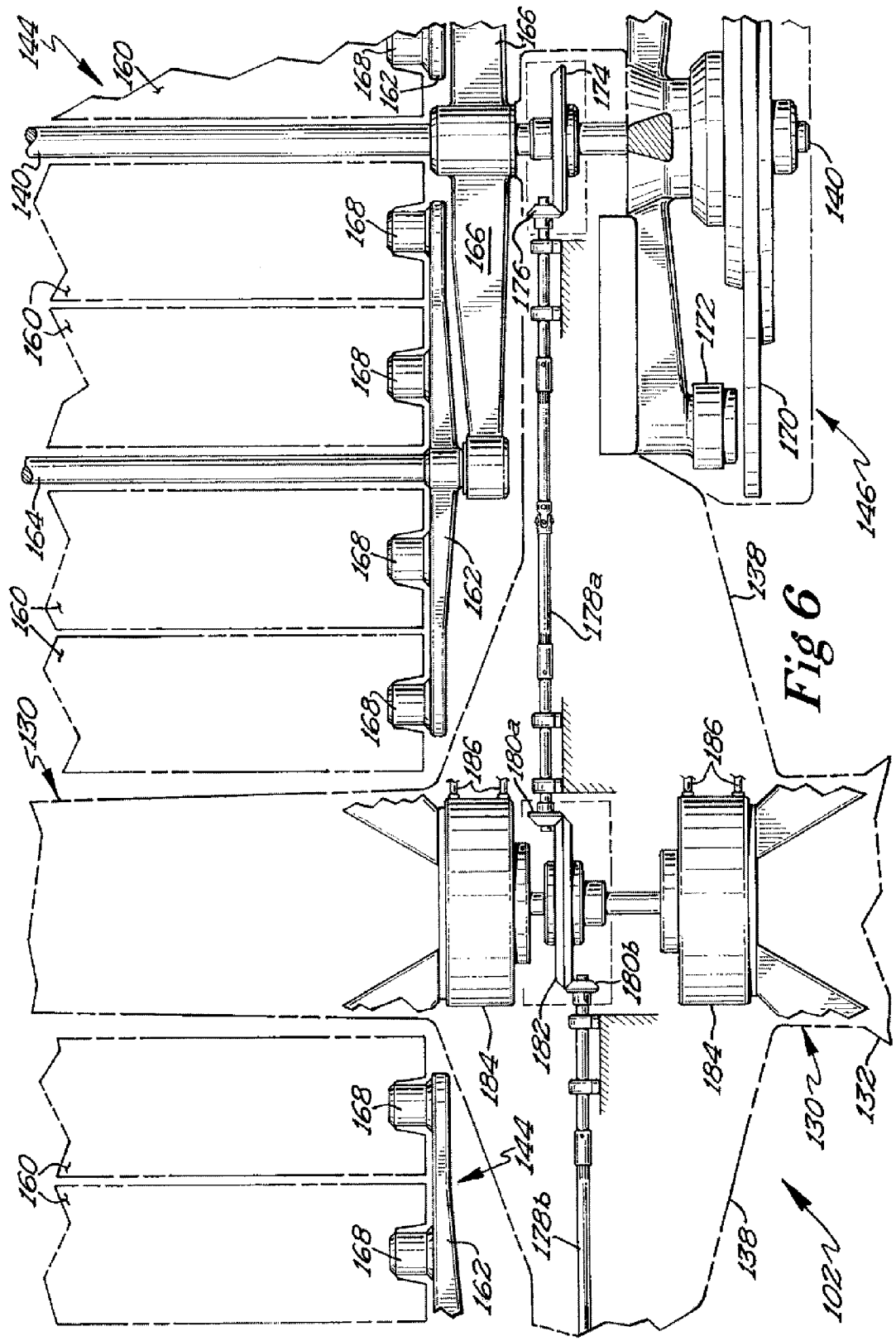
FIG. 6 is a sectional view taken along lines 6-6 of FIG. 5, showing certain details of the wind turbine of FIG. 3.

FIG. 6 is a sectional view taken along lines 6-6 of FIG. 5. As shown in FIG. 6, the shafts 178a and 178b that are driven by sail assemblies on opposite sides of the main tower 130 rotate in opposite directions. Accordingly, to ensure that the rotation of the gears 180a and 180b causes the double ring gear 182 to rotate in a single direction, the gears 180a and 180b are located on opposite sides of the double ring gear 182. That is, while the gear 180a is located above the double ring gear 182, the gear 180b is located below the double ring gear 182. As the double ring gear 182 rotates, it drives hydraulic pumps 184. Ports 186 on the hydraulic pumps 184 permit the inflow and outflow of hydraulic fluid from the hydraulic pumps 184. Hydraulic fluid is conveyed to the control building 104 via a hydraulic fluid line 148 of FIG. 3, which is located underground proximate the base 132 to wind turbine 102.

As demonstrated by the foregoing discussion, various embodiments may provide certain advantages, particularly when compared with horizontal axis wind turbines. With the vertical axis, the wind turbine described herein is both laterally and vertically scalable. For example, by stacking sails vertically with guywire stabilization, the wind turbine can be built to heights of up to 1000 feet. At such high altitudes with higher wind speeds and greater laminar flow, significantly more power can be generated than with horizontal axis wind turbines, which cannot use guywires. In addition, the need for certain structures at the top of the wind turbine, such as the transmission, generator, and yaw mechanism characteristic of horizontal axis wind turbines, is avoided, thereby promoting stability and facilitating repair. The reduced number of mechanical parts may result in a lower initial cost, lower operating costs, greater reliability, and lower cost per kilowatt hour.

In addition, the use of sails may realize a number of advantages relative to both horizontal axis wind turbines and conventional vertical axis wind turbines. Because the sails move symmetrically, for example, the wind turbine is particularly stable, especially in view of the use of the flywheel/gyroscope for balancing. Further, sails can extract far greater wind energy relative to lift-type wind turbines. Gusty or changing wind loads at different tower heights do not cause bending or torturing of sails as they do to propellers on horizontal axis wind turbines. As a result, even under high wind conditions, the sails cannot hit the main tower as propellers can.

The relatively slow rotation speed (20 rpm) of the sails may also produce a number of advantages. Torque generating sails revolving at only 20 rpm will generate significantly less noise as compared with propeller driven wind turbines, whose wingtip velocity can exceed 180 mph and create a noise in excess of 90 dB. Also, because of their low speed, the sails will be visible to birds that can avoid flying into them. By contrast, millions of birds are killed each year by high speed propeller tips that cannot be seen by birds.

The disclosed embodiments overcome one or more of the following problems known in prior art vertical axis technology, ancient to modern: (1) no prior art has been able to extract maximum wind energy by keeping all its airfoils perpendicular to the wind throughout the downwind cycle; (2) no prior art has been able to extract energy on the upwind cycle; (3) no prior art has completely eliminated all negative force on the upwind cycle; (4) no prior art has provided a mechanism to completely eliminate oscillation forces caused by the large downwind power stroke and the negative upwind power stroke; and (5) no prior art has been able to extract wind energy by simultaneously utilizing both drag and lift aerodynamics. The following specific discussion illustrates these advantages of the disclosed embodiments in more detail.

The design of the sails provides unique aerodynamic capabilities; the airfoils disclosed here are true wings. They have a flat side that always faces the wind and an elliptical back side over which the air that is vented between the wings flows. By Bernoulli's principle, this creates decreased air pressure behind the wings and behind the sails, thus creating lift in the same direction that the sails are being pushed by drag (see FIGS. 10 and 11). Also, there are ailerons in both edges of the elliptical side. These ailerons are servo operated and computer controlled to maintain the wings perpendicular to the wind by extending and thereby decreasing lift on the side of the sail mast that may experience greater wind force.

These wings are arrayed in a square sail configuration which confers unique and highly efficient advantages. The sails are composed of two crossbeams and at least two wings mounted on each side of the sail mast. The wing mounting shaft can rotate in the crossbeams and is servo controlled. The sail masts are freewheeling at the ends of the sail arms which are affixed to the main masts. Thus, the sails are a rigid flat structure in which all of the wings can be presented simultaneously in an essentially flat position perpendicular to the wind.

The advantages thus provided may be understood by two analogies: First, the analogy of a commercial airliner in straight and level flight under autopilot control; second, a sailboat sailing downwind and then tacking back upwind. The sails are being driven by the wind much like an airliner is driven by its engines. The airliner stays in straight and level flight because position sensing instruments measure all movements of the aircraft and feed this information to the autopilot allowing it to move control surfaces to maintain straight and level flight. In a similar fashion, sensors on the turbine determine its relation to the wind and feed this information to a computer that then controls either the ailerons or the slant of the wings themselves. Thus, the sails are maintained in perpendicular flight to the wind through both downwind, crosswind and upwind flight. The sails are in free flight and do not "track the wind" as other art with moveable vanes does.

It should be noted at this time that the wings on these sails are repositioned only three times throughout the 360 rotation; once when beginning the downwind 180 degree rotation, once when beginning the 90 degree tack away from a line drawn from 0 degrees to 180 degrees and bisecting the main mast, and once when tacking back to the above line (see FIGS. 8 and 9). This is a dynamic sail that is driven by the wind; the wings are only set to take full advantage of the downwind and upward force of the wind. This differs substantially from prior art that keeps the vanes in continuous motion to track the wind and minimize negative force on the upwind part of the rotation.

Referring again to FIGS. 8 and 9, the aerodynamics of these embodiments solves problems 1, 2, 3 and 5 of the prior art. In overview, these figures represent four sails in each figure that are placed at the four transition points (0, 90, 180, 270 degrees). Although each direction of rotation has only three transition points, the figures have four sails to show that one transition point differs in each direction of rotation. In counterclockwise rotation (FIG. 8) the changing transition point is at 270 degrees and in clockwise rotation the changing transition point is at 90 degrees. In reviewing the wings themselves, it is seen that they are symmetrical about the sail mast. Since the wind force is essentially equal on each side of the sail mast, the wings are self-centering perpendicular to the wind. Again, any asymmetric force on one side of the wing is eliminated by deployment of the ailerons and decreasing lift force on the stronger side of the wing.

The aerodynamics of the sails as wind impacts the wings and flows through the sails imparts drag (push) on the wings and the wind then is compressed against the wings. The compressed wind is then vented between the wings and the high-speed wind, about three times ambient wind speed, flows over the elliptical back side of the wings thus creating lift in the same direction as the drag on the wings. Therefore, this wing and sail design solves problems one and five of the prior art: the entire sail and all the wings remain essentially flat throughout the downwind one-half cycle, extracting maximum downwind drag and lift energy; the sails extract drag energy by wind impacting the flat upwind side of the wings and lift by wind flowing over the curved back side of the wings. Therefore, energy is extracted by keeping the airfoil maximally exposed throughout the downwind cycle and by extracting energy simultaneously by drag and lift. It should be noted that the wings are more efficient with a 10 degree slant since they remove compressed air from the surface of the wings allowing new wind energy to impact the surface and allowing for secondary recovery of energy by lift by allowing the compressed air to flow over the back side of the wings.

Also, these embodiments extract energy on the upwind cycle and thus eliminate all negative force on the upwind cycle, solving problems two and three of the prior art. Referring to FIG. 9, clockwise rotation (FIG. 8 is the reverse in counterclockwise rotation) starting at 0 degrees (same as 360 degrees) with the wind from the south (bottom), the wings are seen to move in a flat position of the sails (canted 10 degrees toward sail mast) and perpendicular relation to the wind from 0 degrees to 180 degrees.

Arriving at the 180 degree position, the wings rotate to a 45 degree slant with the leading edge pointed to the southeast. The south wind then strikes the wings imparting a force vector of 50 percent that drives the wings east and south against the wind. The compressed air (as in downwind) continues to flow between the wings and creates lift in the same clockwise direction since the wings always have the flat side into the wind and the curved side away from the wind. On arriving at the 90 degree position they then rotate 90 degrees so that the leading edge points to the southwest. Now the wind drives the sail to the west and upwind to the 0 degree position as described above. In this way, the wing tacks upwind creating energy in the upwind direction. By definition, no negative force is created in the upwind direction.

Figure 3A:
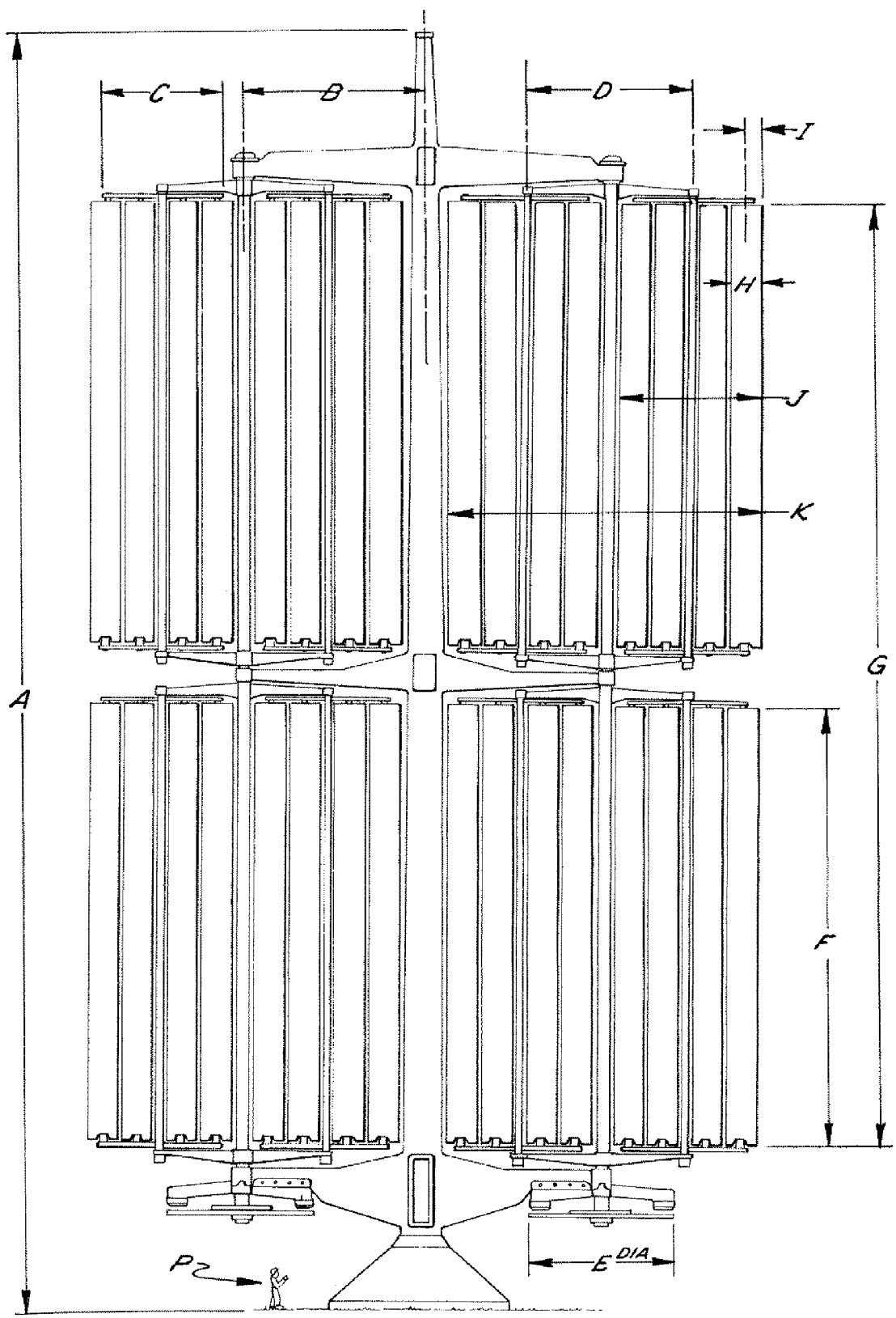
FIG. 3A is an alternative view of FIG. 3 illustrating certain dimensions of the illustrated embodiment.
Figure 3B:
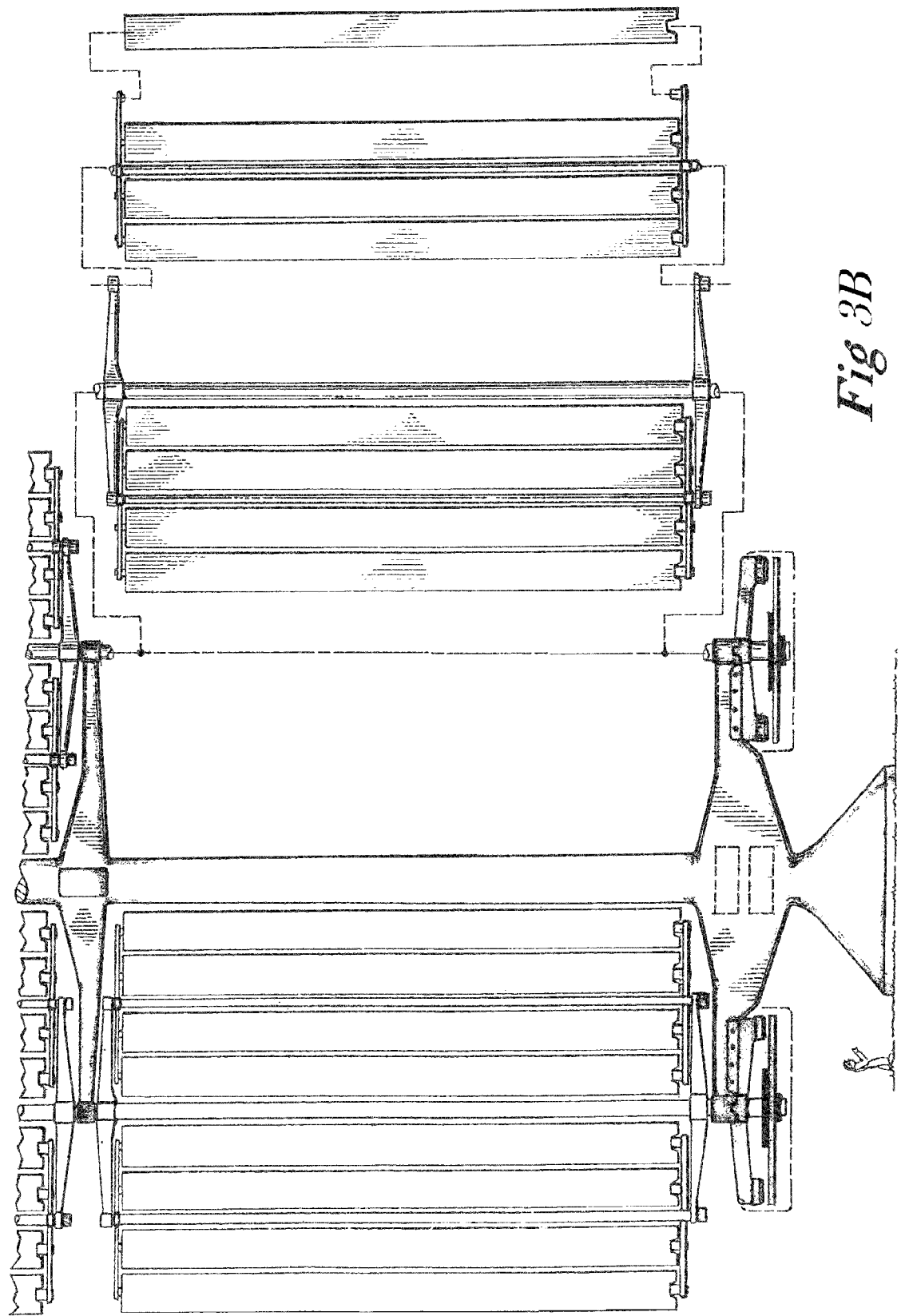
FIG. 3B is a partially exploded view of a portion of FIG. 3.

Referring to FIG. 3A, the following approximate dimensions are preferred but not required. Note that the curved surfaces of some of these components, as illustrated in the other figures, are shown as flat in this view.

| Dimension | Parameter | Preferred Value (feet) |
|---|---|---|
| A | Tower Height | 250 |
| B | Distance Between Tower and Main Masts | 150 |
| C | Width of Crossbeams Supporting Wings | 90 |
| D | Width of Sail Arm Supporting Sail Masts | 120 |
| E | Width of Gyro Assembly | 12 |
| F | Height of Sail Sections | 100 |
| G | Height of Sails | Over 200 |
| H | Width of Wings | 30 |
| I | Half Width of Wings | 15 |
| J | Width of Sails on Common Sail Mast | 130 |
| K | Width of Sail Assembly on Common Main Masts | 2*J or 260 |
| N/A | Sail Surface Area (total upwind side) | 288,000 sq. ft. |
| N/A | Sail Efficiency | At least 75% |
| N/A | Power Output (14 MPH wind) | 20-25 MW (est.) |
| N/A | Operating Wind Speed Range | 2-50+ MPH |
| N/A | Self-Starting | |

The tower has the following unique characteristics: (1) symmetry and weight balance of the transverse mounting arms and main masts allowing them to carry very large sail assemblies and create commercial quantities of power on a minimum number of towers; and (2) a unique mechanical gear and shaft drive system that connects the main masts to the hydraulic pumps, thus combining the power of all four main masts and allowing for counterrotation of masts on opposite sides of the tower and providing a means for keeping all four main mast and sail positions synchronized.

To define this structure further, the transverse mounting arms are fixedly mounted at four equidistant positions around the circumference of the tower. There are three sets of transverse mounting arms and they are set to correspond to the bottom, middle and upper ends of the main masts. As shown in the preferred dimensions of FIG. 3A the lower arm is at the 50 foot level, the middle at the 100 foot level and the top at the 250 foot level. At the outer ends of all the transverse mounting arms are fixedly mounted tapered roller bearing races. On the main masts there are three mated bearing races that are affixed at the bottom, middle and top. The tapered bearings run between these races and carry the load and power of all the sail assemblies. Attached to the main masts, below the lower transverse arm bearings, are fixedly mounted drive gears and below these are fixedly mounted flywheel/gyroscopes. On the main masts and above the transverse arm bearings are fixedly mounted three sets of sail arms which are equally spaced around the circumference of the main masts. At the outer ends of the sail arms are fixedly mounted tapered roller bearing races similar to the races on the transverse arms. The sail masts have three fixed and mated bearing races at the top, middle and lower ends. The roller bearings run between these races. The crossbeams carry the wings which compose the sail. The crossbeams are fixedly mounted to the sail masts and carry the wings which compose the sail. Again, because the sails are symmetrical and self-centering, they always move perpendicular to the wind throughout their entire 360 degree rotation of the main masts.

As also shown in FIG. 3A, the flywheel/gyroscopes are twelve feet in diameter and weigh 20 tons each. The significance of this weight and large diameter is that this will create a very large radial force moment, thus producing a very stable gyroscope on each of the main masts. Since these four gyro-stabilized masts are located in the four quadrants around and are equidistant from the tower, they provide a means of eliminating any oscillation forces that are not cancelled by the counterrotation of the main masts on opposite sides of the tower, thus solving problem (4) of the above five criteria. While other art may use a flywheel for the conventional purpose of storing and smoothing energy flow, none designs their flywheel for the express purpose of creating gyroscopic stabilization and none places flywheels around a central tower to stabilize it. The flywheels in this art also serve as discs for the disc breaking system. Their large diameters provide a way to slowly dissipate the kinetic energy of the turbines when stopping.

A circular gearcase of sufficient diameter and depth to accommodate a large double-cut (teeth on both sides) ring gear and four smaller pinion gears that run along the outer margin on both sides of the ring gear is fixedly mounted inside the lower end of the tower at the level of the lower transverse arms. The gearcase is oriented with the flat side parallel to the bottom of the tower. The gearcase has six circular openings to accommodate shafts that enter or exit the gearcase; these shafts run in bearings and seals that are mounted in the gearcase. A shaft that carries the ring gear exits the top and bottom center of the gearcase. Four more openings are placed around the margins of the gearcase and accept driveshafts that run from the gearcase to the four main masts. Similar gearcases of sufficient size and shape to accommodate the drive gears at the bottoms of the main masts and the drive gears at the outer ends of the driveshafts are fixedly mounted at the ends of the transverse arms. The gearcases have bearing and seal lined openings at the top to accept the main masts and bearing and seal lined openings parallel to the transverse arms to accept the driveshafts that run through the transverse arms. The driveshafts have gears at both ends, and these mate with the ring gear inside the tower and the drive gears at the bottoms of the main masts. The driveshafts are supported by a sufficient number of bearing blocks that are affixed to the transverse arms. The shafts have slip joints to allow for expansion and contraction.

The mechanical gear and shaft drive system of this embodiment serves specific purposes that are not present in the prior art. First, it allows for counterrotation of the main masts on opposite sides of the tower by engaging opposite sides of the ring gear. Second, it allows for synchronization of all the main masts so that all the sails can be kept approximately 100 yards apart, thus eliminating wind shadow on all of the sails. One hundred yards is the distance that it takes for the wind to resume full velocity after encountering a windfoil. Third, it allows for the merging of power from four independent main masts that each carries three sets of sails. Fourth, it is able to cause a substantial gear reduction to drive the hydraulic pumps with increased force.

The disclosed embodiments may be compared to U.S. Pat. No. 4,496,847 of William E. Parkins. While these two systems may at first appear to be the same, since they both transfer power from multiple turbines to a central generator, the mechanics of the hydraulics are entirely different and are used to transfer power and to control the turbines in completely different ways.

The two hydraulic pumps are fixedly mounted inside the lower part of the tower above and below the gearcase. The ring gear shaft that extends above and below the gearcase is connected to the power shafts of two rotary sliding-vane hydraulic pumps. (These are the type of pumps that are routinely used on almost all hydraulically powered equipment.) These pumps are thus driven by the center shaft of the ring gear. Since the ring gear is much larger in diameter than the pinion gears driving it, a large gear reduction allows for very high torque on the hydraulic pumps.

The hydraulic fluid output from these pumps is then transferred by high strength steel pipe to the generator building where it is combined with the hydraulic fluid from the other towers. This combined hydraulic fluid is divided into two pipes that separately turn two sliding-vane hydraulic motors. These motors are, in essence, the reverse of the hydraulic pumps in the towers.

The velocity of the turbines and generators is torque (pressure) controlled. This is accomplished in the following way: Increased wind force on the turbine causes a rise in the hydraulic fluid pressure. Sensors detect this pressure increase and then direct an increase in the strength of the armatures on the generators. This causes the generator field to produce more electricity and the persistent increased fluid pressure to keep the velocity of the turbines constant. Both the turbine and the generators turn at a constant 20 RPM. The generators are wound to produce 60 cycle current at this RPM.

This differs from Parkins in the following ways: First, Parkins controls his apparatus by increasing the volume of fluid flow, not by increasing fluid pressure. Thus, his apparatus is volume (flow) controlled not pressure (torque) controlled. Second, Parkins uses a multistage piston pump to increase flow volume by adding progressively more pistons to control volume at higher turbine velocities. Third, Parkins uses a turbine to drive his generators, not sliding-vaned rotary pumps. This, however, will not work since turbines are only efficient when driven by high-velocity fluids (liquid or gas). Under the relatively low velocities of hydraulic fluid flow and with a generator under load, the fluid will simply flow between the blades of the turbine and will not drive the generator. Fourth, the volume of hydraulic fluid flow in Parkins changes with increasing turbine power. The volume of fluid flow in the embodiments of this application remains constant. Fifth, the velocity of the Parkins generator varies with power available while that of this application remains constant. The significance of this is that, by maintaining a constant velocity, the generator output can be maintained at 60 cycle per second by winding the generator properly. Parkins requires an inverter to maintain 60 cycles per second and this is less efficient.

The disclosed embodiments may also be compared to U.S. Pat. No. 1,577,096 of Arthur A. Aust which, at first glance, appears physically similar to the preferred embodiments depicted here. However, much, if not all, of this apparent similarity follows from coincidences in language rather than corresponding structure and function. In fact, using the five criteria above, the embodiments disclosed here are superior over Aust for the following reasons: First, the disclosed embodiments keep the wings perpendicular to the wind throughout the downwind cycle. Aust has only one vane perpendicular to the wind through the downwind cycle. Second, these embodiments extract over fifty percent power on the upwind cycle, but Aust extracts no power on the upwind cycle at all. Third, these embodiments eliminate all negative force on the upwind cycle. Aust has negative force on the upwind cycle. Fourth, these embodiments eliminate oscillation forces by counterrotation on opposite sides of the tower and by gyroscopic stabilization of the tower. Aust creates oscillation forces by using counterrotation on the same side of the tower. Fifth, these embodiments can extract wind energy by utilizing both drag and lift simultaneously. Aust extracts wind energy using only drag.

It will be understood by those who practice the embodiments described herein and those skilled in the art that various modifications and improvements may be made without departing from the spirit and scope of the disclosed embodiments. The scope of protection afforded is to be determined solely by the claims and by the breadth of interpretation allowed by law.

I claim:

1. A wind turbine comprising:
   a main tower;
   an upper set and a lower set of transverse mounting arms, each set including at least four transverse mounting arms mounted on and supported by the main tower;
   at least two sail assemblies each of which is mounted between one of the at least four transverse mounting arms of the upper set and one of the at least four transverse mounting arms of the lower set, each sail assembly comprising:
      a sail mast defining a vertical axis of rotation,
      at least two sail arms mounted on and supported by the sail mast, the at least two sail arms including an upper sail arm and a lower sail arm; and
      a plurality of wings mounted to the upper sail arm and the lower sail arm so as to rotate about the vertical axis of rotation in response to wind; wherein each wing has a flat side and an opposing elliptical side; and
   a hydraulic pump configured and arranged to generate a constant volume hydraulic output in response to rotation of the the plurality of wings about the vertical axis of rotation.

2. The wind turbine of claim 1, in which the wings are configured to be rotated to a first orientation when the sail is moving in an upwind direction and to a second orientation when the sail is moving in a downwind direction.

3. The wind turbine of claim 2, in which the sail assembly further comprises a plurality of servo motors configured to selectively rotate the wings to the first and second orientations.

4. The wind turbine of claim 3, further comprising a microprocessor-based system configured to control operation of the wings.

5. The wind turbine of claim 1, in which the sail assembly comprises three sail arms.

6. The wind turbine of claim 1, further comprising a flywheel assembly operatively coupled to the sail assembly.

7. The wind turbine of claim 6, in which the flywheel assembly is sized and configured to function as a gyroscope.

8. The wind turbine of claim 6, further comprising a plurality of hydraulic brakes, and in which the flywheel is configured to act as a brake disk for the hydraulic brakes.

9. The wind turbine of claim 1, further comprising a gearcase configured and arranged to drive the hydraulic pump in response to movement of the sails.

10. The wind turbine of claim 1, in which the gearcase comprises a shaft arrangement having a variable effective length.

11. The wind turbine of claim 10, in which the shaft arrangement comprises a plurality of segments arranged in a slip-fitting arrangement.

12. The wind turbine of claim 10, in which the shaft arrangement comprises a plurality of segments connected to one another via universal joints.

13. A wind turbine arrangement comprising:
   a plurality of wind turbines each comprising
      a main tower,
      an upper set and a lower set of transverse mounting arms, each set including at least four transverse mounting arms mounted on and supported by the main tower, and
      two sail assemblies each of which is mounted between one of the at least four transverse mounting arms of the upper set and one of the at least four transverse mounting arms of the lower set, each sail assembly comprising
         a sail mast defining a vertical axis of rotation,
            at least two sail arms mounted on and supported by the sail mast, the at least two sail arms including an upper sail arm and a lower sail arm; and
            a plurality of wings mounted to the upper sail arm and the lower sail arm so as to rotate about the vertical axis of rotation in response to wind, wherein each wing has a flat side and an opposing elliptical side; and
      each wind turbine configured to generate a hydraulic output in response to rotation of the plurality of wings about the vertical axis of rotation, in which the hydraulic outputs of the wind turbines are linked together;
   an electrical generator, and
   a hydraulic pump configured to receive the linked hydraulic outputs of the wind turbines and to drive the electrical generator at constant hydraulic volume.

14. The wind turbine arrangement of claim 13, in which the electrical generator and the hydraulic pump are housed in a control building.

15. The wind turbine arrangement of claim 14, in which the control building comprises a pressure equalizer configured to equalize fluid pressures between the linked hydraulic outputs of the wind turbines.

16. The wind turbine arrangement of claim 14, in which the control building comprises: a plurality of electrical generators; a plurality of hydraulic motors; and a splitter arrangement to split the linked hydraulic outputs of the wind turbines among the plurality of hydraulic motors.

17. The wind turbine arrangement of claim 13, in which the wings are configured to be rotated to a first orientation when the sail is moving in an upwind direction and to a second orientation when the sail is moving in a downwind direction.

18. The wind turbine arrangement of claim 17, in which the sail assembly further comprises a plurality of servo motors configured to selectively rotate the wings to the first and second orientations.

19. The wind turbine arrangement of claim 13, in which each wind turbine further comprises a flywheel assembly operatively coupled to the sail assembly.

20. The wind turbine arrangement of claim 19, in which the flywheel assembly is sized and configured to function as a gyroscope.

21. The wind turbine arrangement of claim 19, further comprising a plurality of hydraulic brakes, and in which the flywheel is configured to act as a brake disk for the hydraulic brakes.

22. The wind turbine arrangement of claim 13, in which each wind turbine further comprises a gearcase configured and arranged to drive the hydraulic pump in response to movement of the sails.

23. The wind turbine arrangement of claim 22, in which the gearcase comprises a shaft arrangement having a variable effective length.

24. A wind turbine comprising:
a main tower;
an upper set of an a lower set of transverse mounting arms, each set including a plurality of transverse mounting arms mounted on and supported by the main tower;
a plurality of sail assemblies, each of which is mounted between one of the at least two of the transverse mounting arms, each sail assembly comprising:
a sail mast defining a vertical axis of rotation,
at least two sail arms mounted on and supported by the main mast, and
a plurality of wings mounted to the upper sail arm and the lower sail arm so as to rotate about the vertical axis of rotation in response to wind; wherein each wing has a flat side and an opposing elliptical side; in which the wings are configured to be rotated to a first orientation when the sail is moving in an upwind direction and to a second orientation when the sail is moving in a downwind direction;
a plurality of servo motors configured to selectively rotate the wings to the first and second orientations; and
a hydraulic pump configured and arranged to generate a constant volume hydraulic output in response to rotation of the sail.

* * * * *